United States Patent Office 2,778,130
Patented Jan. 22, 1957

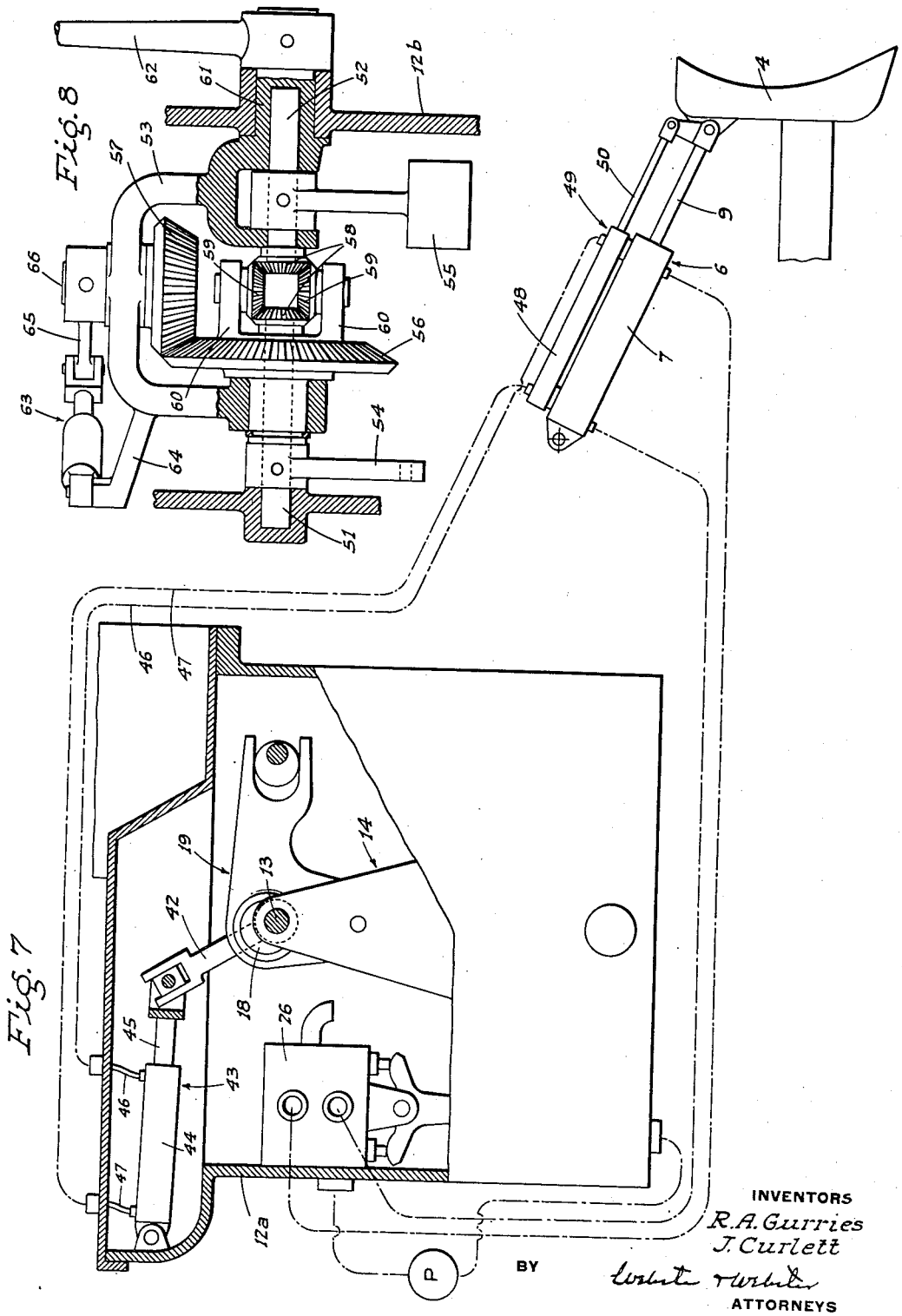

2,778,130
LEVEL CONTROL SYSTEM FOR BULLDOZER BLADES

Raymond A. Gurries, San Jose, and John Curlett, Los Gatos, Calif., assignors, by direct and mesne assignments, to Gurries Manufacturing Co., San Jose, Calif., a corporation of California Application March 16, 1955, Serial No. 494,738

7 Claims. (Cl. 37—144)

This invention relates to tractor-mounted bulldozers such as are used to make and maintain a smooth cut in the ground to a desired grade.

When used for this work, it is very often necessary for the operator to frequently adjust the bulldozer blade relative to the tractor to correct the level of the blade to compensate for the longitudinal pitching or tilting of the tractor as it advances.

The principal object of this invention is to provide an automatically functioning device which will adjust and maintain the bulldozer blade at a predetermined level relative to the grade as the tractor pitches or tilts, and eliminating the need for the operator to manually control the leveling or compensating movement of the blade as must now be done.

Another object of the invention is to provide, in connection with and as a part of said device, a means to enable the operator to manually control the adjustment of the blade, without depending on tractor tilt to accomplish such adjustment.

Such means includes a hand-operated lever; and in connection with the feature of the above named object, a further object is to arrange said device so that movement of the hand-operated lever a certain distance in one direction will effect a movement of the bulldozer blade a proportionate distance in a corresponding direction without the operator having to then move said lever in the opposite direction to stop the blade movement when said blade has moved such distance.

No skill on the part of the operator is, therefore, necessary to thus control the blade movement, since he needs to only move the lever the amount he desires the blade to move. The automatic features of the device then function to halt the blade when it has moved the desired amount, irrespective of tractor movement or relative position or level.

Still another object of the invention is to provide a level control system for bulldozer blades which is practical and reliable, and one which is exceedingly effective for the purpose for which it is designed.

These objects are accomplished by means of such structure and relative arrangement of parts as will fully appear by a perusal of the following specification and claims.

In the drawings:

Fig. 7 is a view similar to Fig. 2, but showing a modified form of mechanism for automatically actuating the control valve.

Fig. 8 is a fragmentary transverse section of a modified form of valve control unit which may be actuated by a hydraulic mechanism as employed in the arrangement of Fig. 7.

Figure 1:
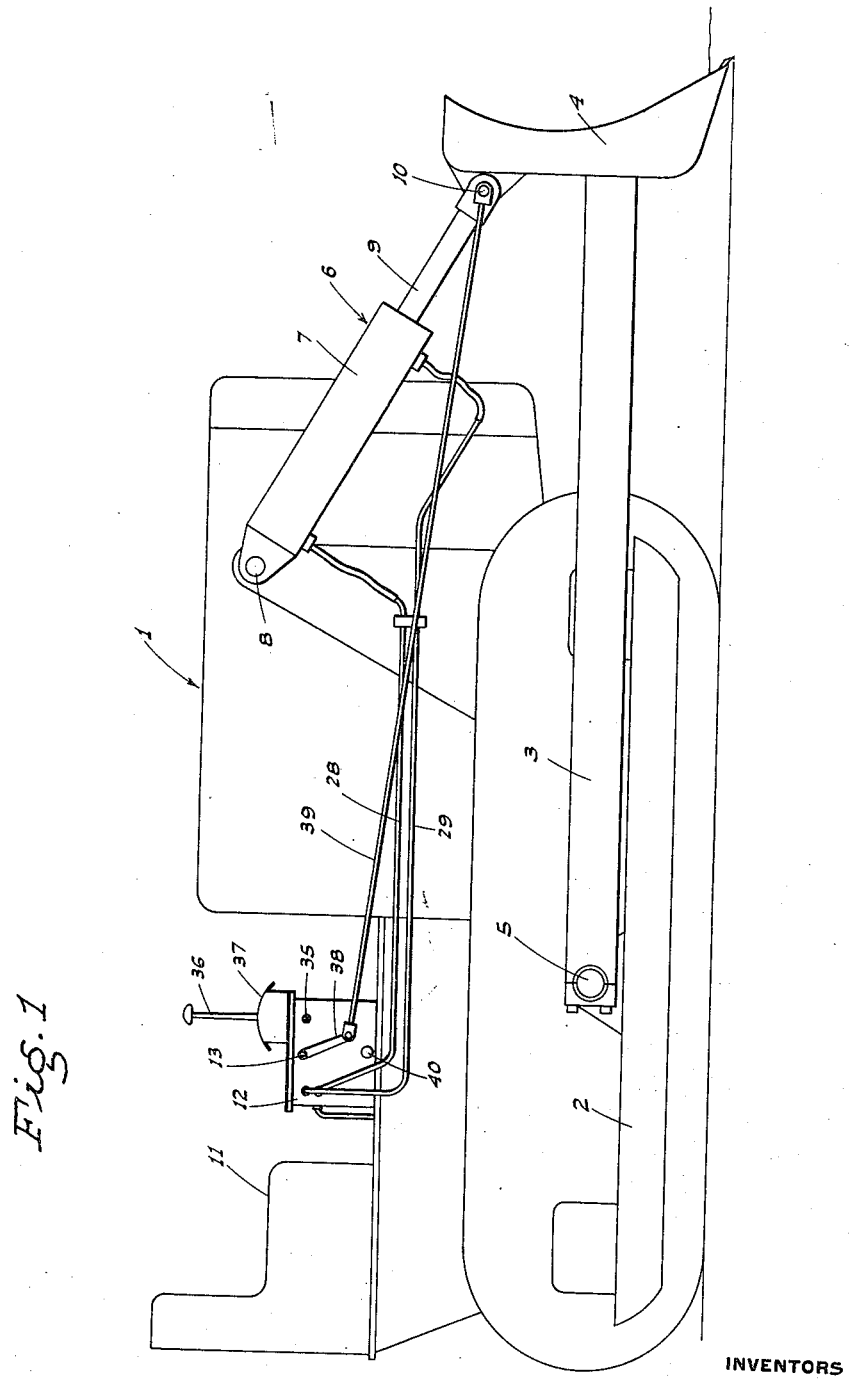
Fig. 1 is a side outline of a conventional crawler-type tractor and bulldozer unit equipped with a hydraulic ram for raising and lowering the bulldozer, and showing the improved ram control device mounted on the tractor and operatively connected to the ram and bulldozer.
Figure 2:
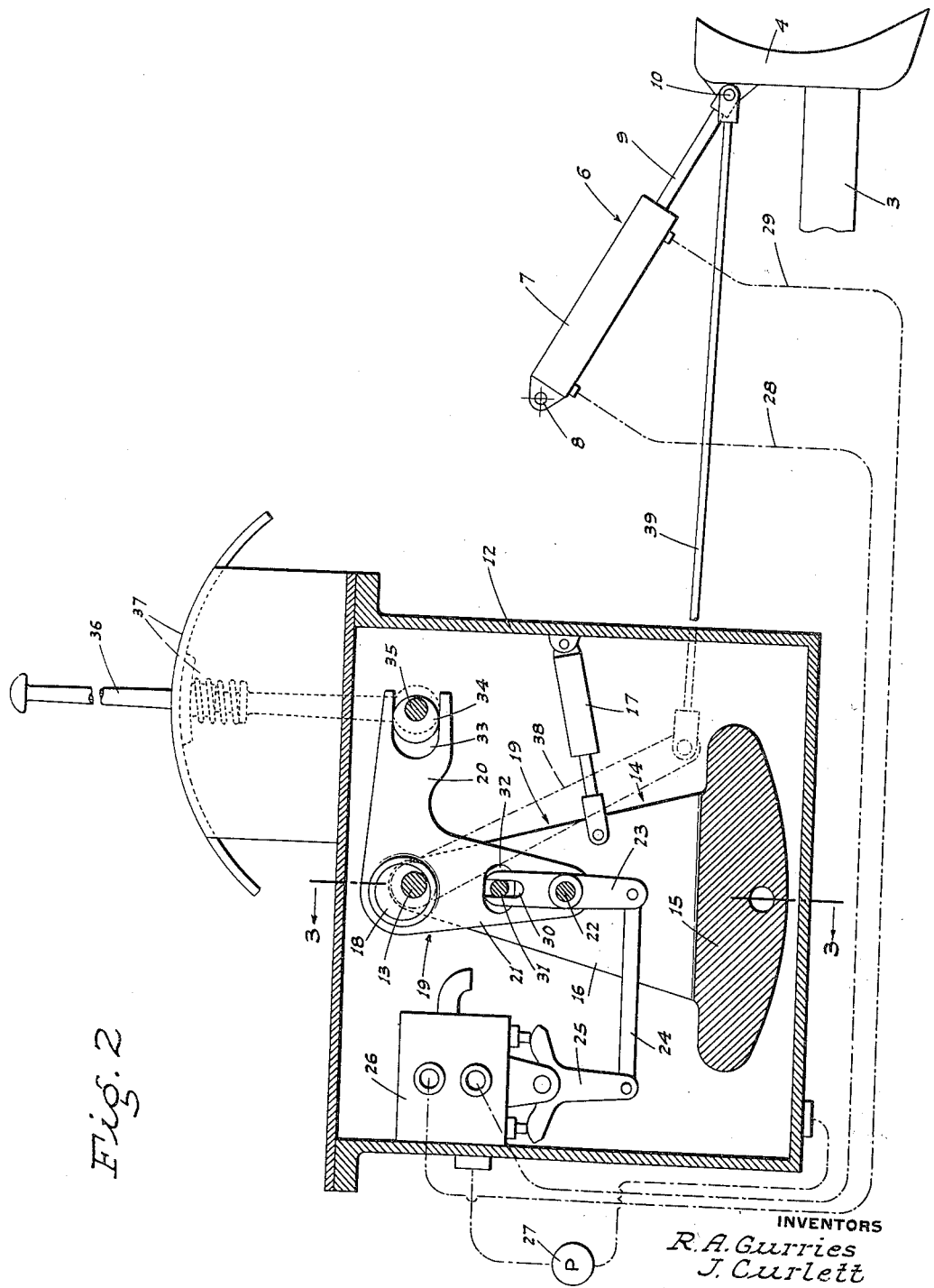
Fig. 2 is an enlarged sectional elevation of the main unit of the control device, with a diagrammatic showing of the conduit system between said unit and the bulldozer and ram. In this view, the fluid control valve of the unit is shown in its neutral or closed and holding position.

Referring now more particularly to the characters of reference on the drawings, and particularly at present to the form of the invention shown in Figs. 1-6, the structure to which the control mechanism is applied comprises essentially a tractor, indicated generally at 1, and to the side frames 2 of which the forwardly projecting side beams 3 of a bulldozer blade 4 are pivoted at their rear ends, as at 5.

Hydraulic rams, one of which is indicated generally at 6, control the raising and lowering of the bulldozer about pivots 5. Each ram comprises a cylinder 7 pivoted at its rear end at a fixed point on the tractor, as at 8, and a piston rod 9 pivoted at its forward end on the bulldozer blade, as at 10.

Pivot 10 is a considerable distance above the horizontal plane of pivot 5 so that as the blade is raised or lowered the pivot 10 moves respectively closer to or further away from any fixed point on the tractor above and rearwardly of pivot 5. The purpose of this positioning of pivot 10 will be seen hereinafter.

Secured on the tractor rearwardly of the ram, and in a position accessible from the operator's seat 11 on the tractor, is a case 12, in which the main control mechanism is mounted. This mechanism comprises a cross shaft 13 on which a pendulum 14 is hung for swinging movement without rotating the shaft. The pendulum comprises a weighted base portion 15 and upstanding transversely spaced arms 16. Undue freedom or ease of swinging of the pendulum may be prevented by a dashpot unit 17 connected to the pendulum and case.

Figure 3:
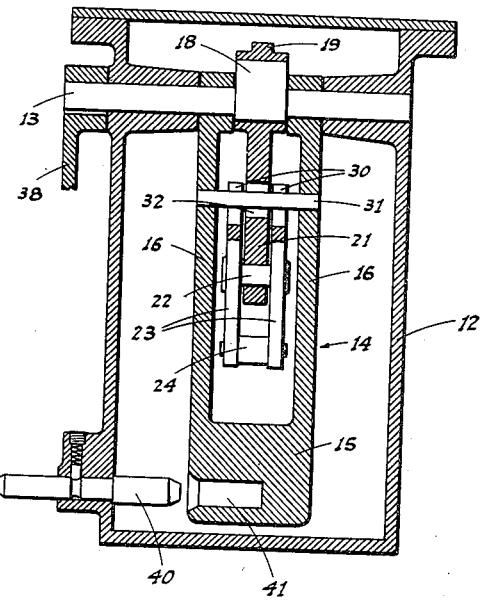
Fig. 3 is a transverse section on line 3—3 of Fig. 2.

Fixed on shaft 13 is an eccentric 18, turnable on which—between arms 16—is a bellcrank lever 19 having a forwardly projecting arm 20 and a depending arm 21. A transverse pin 22 is mounted in arm 21 at its lower end, and fixed on pin 22, intermediate its ends, is an upstanding lever 23 which, while here considered as a single member, is preferably a double lever unit which straddles the arm 21, as shown in Fig. 3. The lower end of lever 23 is connected by a link 24 with the rocking actuating arm 25 of a four-way valve 26 mounted in the case to the rear of the pendulum. This valve is preferably of that type shown in the co-pending application of John Curlett, Serial No. 477,830, filed December 27, 1954.

Pressure is supplied to the valve from a pump 27 on the tractor; the valve discharging into the case 12 and the pump taking its oil from the case, which forms a reservoir.

One conduit 28 from the valve leads to one end of the ram, while another conduit 29 leads from the valve to the other end of the ram. The conduits are connected to the ram and valve in such relation that when arm 25 swings to the rear, communication is established between the pump and the forward end of the ram through conduit 29 to raise the bulldozer, the fluid from the rear end of the ram being relieved into case 12 through conduit 28.

Similarly, when arm 25 swings forwardly, fluid is fed to the rear end of the ram to lower the bulldozer through conduit 28 and is relieved into case 12 through conduit 29.

The upper end of arm 23 is vertically slotted or forked, as at 30, and is engaged by a cross pin 31 secured in the arms 16 of the pendulum; the pin 31 passing through a clearance opening 32 in bellcrank arm 21.

The forward end of bellcrank arm 20 is formed as a horizontal fork 33 which straddles an eccentric 34 fixed on a cross shaft 35 journaled in case 12. An upstanding control lever 36 is secured to shaft 35 on one end thereof outside the case; a yieldable position retaining unit 37—in part on the case and in part on the lever—acting to hold the lever in any position to which it may be shifted.

A follow-up arm 38 is secured on and depends from shaft 13 on the laterally outer side of case 12; said arm being connected by a push-pull rod 39 to pivot 10.

With the above described arrangement of parts, the operation of the device is as follows:

Initially, the bulldozer blade is set to cut to a certain depth, as indicated for instance in Fig. 1, by movement of hand lever 36 while the tractor is in a normal level position.

Figure 4:
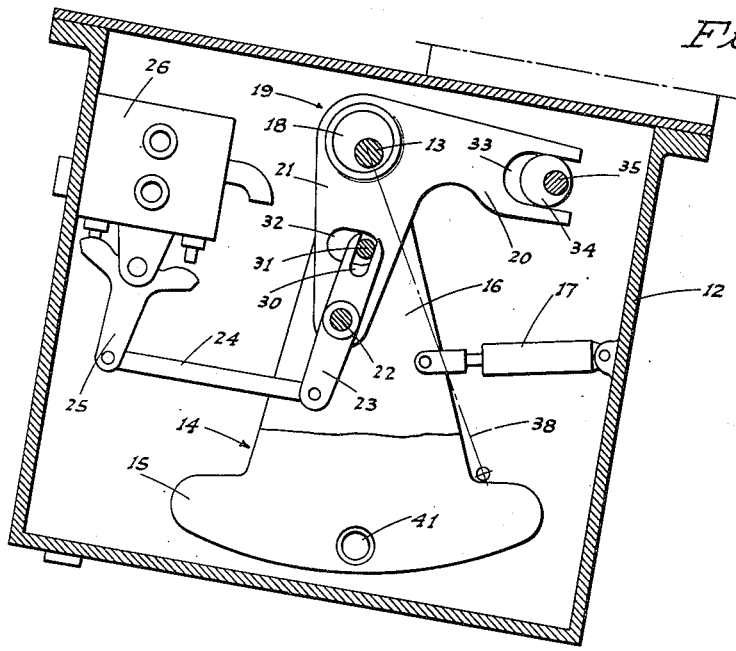
Fig. 4 is an enlarged sectional elevation of said main unit, showing the same downwardly tilted to the front, and with the control valve consequently opened to admit fluid to the ram to lift the same.

Assuming that the tractor dips or tilts down toward the front during its forward movement, the case 12 assumes a corresponding tilt—as shown for instance in Fig. 4. With such tilting of the tractor, the bulldozer blade being rigid with the tractor and in front of the same, digs more deeply than intended into the ground. This excessive digging is automatically counteracted by the action of the automatic mechanism in the following manner:

As the tractor and the case 12 tilt, the pendulum 14 remains in its vertical position. The bellcrank 19 remains unmoved in the case, but the pin 31, mounted on the pendulum, shifts relatively forward. This causes the lever 23 to swing at its lower end toward the rear, opening valve 26 and admitting fluid to the forward end of the ram to lift the bulldozer blade.

Figure 5:
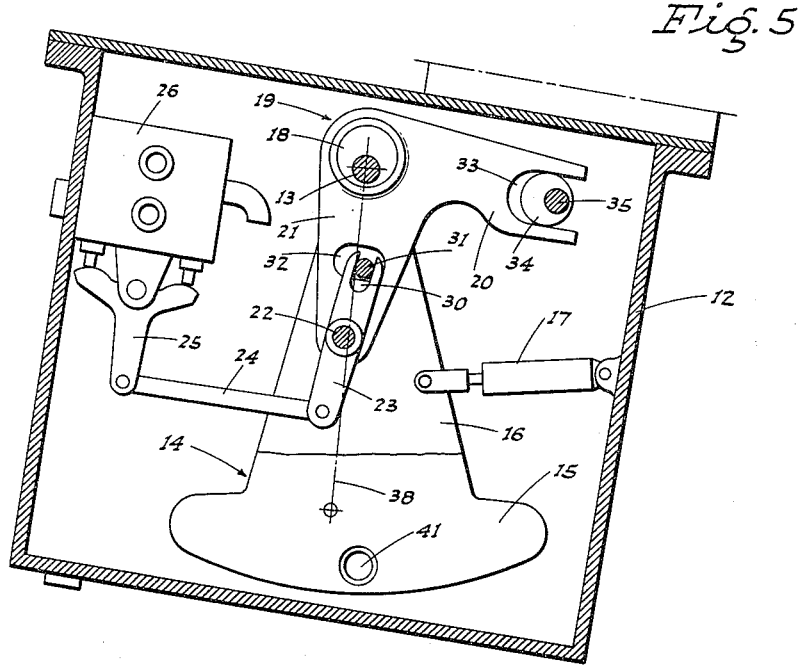
Fig. 5 is a similar view, showing the unit in the same tilted position, but with the valve restored to a closed position by the action of the follow-up lever.

This moves the pivot pin 10 on the bulldozer blade closer to the rear end of lever 38 than was originally the case, causing said lever to be swung toward the rear. This causes the eccentric 34 to be rotated in bellcrank 19, as shown in Fig. 5. This eccentric is disposed on shaft 13 so that with such rotation the arms 21 and cross pin 22 thereon are swung forwardly; the bellcrank 19, as a whole, rocking about eccentric 34 as an axis.

This change of position of the cross pin 22, while pin 31 remains in a forward position, causes the lever 23 to be restored to its initial position, closing the valve and holding the ram and the bulldozer in their relatively raised position.

As the tractor then reassumes its initial level position and the pendulum swings back, the position of lever 23 becomes reversed, and the valve is opened to admit fluid to the other end of the ram, lowering the bulldozer blade as the front end of the tractor raises to a level position.

At the same time, the follow-up lever 38 is pulled forwardly, so that by the time the tractor has reached its proper level position, the valve is again closed and the parts are restored to their original position, with the bulldozer blade in its pre-set relation to the ground.

If the tractor becomes tilted upwardly at its forward end, the automatic device functions in the same manner, but, of course, with a movement of the parts in the opposite direction.

At times, it may be desired to control the bulldozer blade entirely by hand without the functioning of the automatic mechanism. This may be done by first preventing the pendulum from swinging. To this end, locking means for the pendulum is provided, which in the present case is shown as being a manually advanced or retracted holding pin 40 (see Fig. 3) slidably mounted in one side of the case 12 for movement transversely thereof. This pin, when pulled out or retracted, clears the pendulum as shown, but may be advanced to enter a bore 41 in the base 15 of the pendulum so that the latter is then held rigid with case 12.

Figure 6:
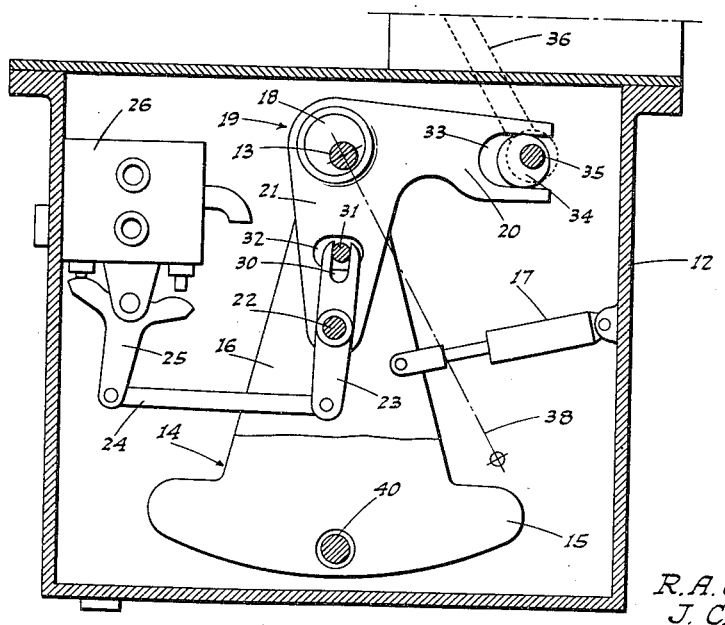
Fig. 6 is a similar view of the main unit, shown in its normal or level position, with the pendulum locked against movement and with the valve opened by the action of the hand lever.

The valve 26 can then be opened or closed by manipulation of lever 36 so as to swing lever 23 forward or back from its normal neutral position, as described in connection with Fig. 6.

The eccentric 34 is disposed on shaft 35 relative to lever 36 so that upon rearward movement of the latter, bellcrank 19 will be rotated on eccentric 18 as a pivot so that arm 21 is swung to the rear. Since the pendulum-mounted pin 31, which engages lever 23 is then stationary, said lever 23 is swung toward the rear at its lower end. This causes valve 26 to open, so as to feed fluid to the forward end of the ram 6, raising the bulldozer blade.

At the same time, such raising of the blade causes a rearward movement to be imparted to follow-up lever 38. This lever movement causes a closing of the valve to be effected in the same manner as previously described. Thus, with any predetermined amount of handle movement, the blade will be raised an exact proportional amount, and will then stop without the operator having to move handle lever 36 back to its original position to halt the movement of the blade.

Instead of the lever 38 and link 39 controlling rotation of shaft 13, a hydraulic device may be employed to effect such rotation upon raising or lowering of the bulldozer blade.

Such a device is shown in Fig. 7 and comprises a follow-up lever 42 inside the case 12a, and upstanding from shaft 13. This lever is connected to a substantially horizontal hydraulic unit 43 which includes a cylinder 44 anchored to the case and a piston rod 45 connected to lever 42.

The front and rear ends of the cylinder 44 are connected by conduits 46 and 47 to the corresponding ends of the cylinder 48 of another hydraulic unit 49 which includes a piston rod 50.

Unit 49 is mounted in connection with ram 6; cylinder 48 being fixed on the cylinder 7 of such ram, while piston rod 50 is secured in connection with piston rod 9.

Cylinders 44 and 48, and their connecting conduits are completely filled with hydraulic fluid; the relative sizes of the cylinders being such as to give the necessary stroke movement of piston rod 45 with a full-stroke movement of piston rod 9.

Such hydraulic means may be used in connection with the modified valve control structure shown in Fig. 8.

This structure, which is mounted in a tractor-mounted case 12b, comprises alined transverse shafts 51 and 52 journaled in the case and in a rigid upstanding yoke 53.

A valve-actuating arm 54 is secured on and depends from shaft 51 between the adjacent wall of the case and the adjacent side of the yoke, while a pendulum 55 is secured on and depends from shaft 52 within the case.

A bevel gear 56 is mounted on shaft 51 and is in mesh with a bevel pinion 57 mounted in the yoke. Facing bevel gears 58 are fixed on the adjacent ends of shafts 51 and 52 and are in mesh with opposed bevel gears 59 journaled in arms 60 projecting from and rigid with gear 56. The yoke 53 includes a hub 61 journaled in and projecting from one side of the case 12b, and on the outer end of which an upstanding hand lever 62, corresponding to lever 36, is mounted.

A hydraulic cylinder unit 63, corresponding to unit 43 of Fig. 7 and actuated upon raising and lowering of the bulldozer blade, extends between and is connected to a bracket 64 projecting from the yoke and a radial arm 65 secured on and projecting from the axial shaft 66 of pinion 57 and which is journaled in the yoke.

In the operation of this form of the device, swinging of the pendulum 55 in one direction imparts rotation to shaft 51 in the opposite direction to open the valve 26 by reason of the interconnected differential gearing 58—59. At the same time, due to the raising or lowering of the bulldozer blade—occasioned by such opening of valve 26—the hydraulic unit 63 is extended. This turns pinion 57 and gear 56, and due to the connection of the latter with gears 59, shaft 51 is rotated in the opposite direction to cause the valve to be closed. When unit 63 is inactive and in effect locked, swinging of lever 62 will turn the yoke and gear 56 as a unit, imparting rotation to the shaft 51 in a valve opening direction by reason of the action of gearing 58 and 59, as will be evident.

While the improved control system has been here shown and particularly described as being used in connection with a hydraulically controlled front-end bulldozer blade, it will be obvious that the system may be used with equal effectiveness to control the level of a tool bar or similar tool member mounted at the rear end of the tractor.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. In combination with a tractor and a tool member mounted thereon for up and down movement relative to the tractor; a normally inactive hydraulic ram connected to the tractor and member to raise and lower the latter relative to the tractor and normally maintaining the member rigid with the tractor, a conduit system to supply fluid to the ram including a normally closed valve, a mechanism mounted on the tractor and including a fixed case in which the valve is mounted, a pendulum disposed in the case for swinging movement in a plane lengthwise of the tractor, the valve including an actuating arm, a first lever linked to the arm, a shaft supported in the case on which the pendulum is hung, an eccentric secured on the shaft, a second lever, the latter lever being pivoted intermediate its ends on the eccentric, means pivoting the first lever on said second lever adjacent one end of the latter, an anchor point for the other end of said second lever, means connecting the pendulum and first lever to swing the latter in a valve opening direction upon relative swinging of the pendulum so as to actuate the ram and move the tool member, and means between the tool member and shaft to rotate the shaft and the eccentric thereon to cause said second lever to swing about the anchor point as an axis in a direction to swing the first lever in a valve closing direction upon movement of the member to a pre-set level.

2. In combination with a tractor and a tool member mounted thereon for up and down movement relative to the tractor; a normally inactive hydraulic ram connected to the tractor and blade to raise and lower the latter relative to the tractor and normally maintaining the blade rigid with the tractor, a conduit system to supply fluid to the ram including a normally closed valve, a mechanism mounted on the tractor and including a fixed case in which the valve is mounted, a pendulum disposed in the case for swinging movement in a plane lengthwise of the tractor, the valve including an actuating arm, a first lever linked to the arm, a shaft supported in the case on which the pendulum is hung, an eccentric secured on the shaft, a second lever, the latter lever being pivoted on the eccentric, means pivoting the first lever on said second lever adjacent one end of the latter, an anchor point for said second lever remote from said one end thereof and separate from the eccentric, means connecting the pendulum and first lever to swing the latter in a valve opening direction upon relative swinging of the pendulum so as to actuate the ram and move the tool member, and means between the tool member and shaft to rotate the shaft and the eccentric thereon to cause said second lever to swing about the anchor point as an axis in a direction to swing the first lever in a valve closing direction upon movement of the blade to a pre-set level.

3. A structure, as in claim 2, in which the last named means comprises a hydraulic cylinder unit mounted on the ram lengthwise thereof and including a piston rod connected to the bulldozer blade, a cooperating hydraulic cylinder unit mounted in the case and including a piston rod, and an arm fixed on the shaft to which the last named piston rod is connected; there being fluid-filled conduits connecting the cylinders of said units.

4. In combination with a tractor and a bulldozer blade mounted thereon for up and down movement relative to the tractor; a normally inactive hydraulic ram connected to the tractor and blade to raise and lower the latter relative to the tractor and normally maintaining the blade rigid with the tractor, a conduit system to supply fluid to the ram including a normally closed valve, a mechanism mounted on the tractor and including a fixed case in which the valve is mounted, a pendulum disposed in the case for swinging movement in a plane lengthwise of the tractor, the valve including an actuating arm, a first lever linked to the arm, a shaft supported in the case on which the pendulum is hung, an eccentric secured on the shaft, a second lever, the latter lever being pivoted on the eccentric, means pivoting the first lever on said second lever adjacent one end of the latter, an anchor point for said second lever remote from said one end thereof and separate from the eccentric, means connecting the pendulum and first lever to swing the latter in a valve opening direction upon relative swinging of the pendulum so as to actuate the ram and move the bulldozer blade, and means between the bulldozer blade and shaft to rotate the shaft and the eccentric thereon to cause said second lever to swing about the anchor point as an axis in a direction to swing the first lever in a valve closing direction upon movement of the blade to a pre-set level; the last-named means comprising an arm secured on and projecting from the shaft outside the case, and a link connecting the arm and a predetermined point on the bulldozer blade; there being means pivoting the bulldozer on the tractor in such position relative to said predetermined point of connection of the arm and blade as to cause such point to shift lengthwise of the tractor and relative to the case upon raising and lowering of the blade.

5. A structure, as in claim 2, in which the means connecting the pendulum and the first lever comprises a cross pin secured in the pendulum intermediate its ends and projecting in laterally fitting relation into an opening in the first lever.

6. In combination with a tractor and a tool member mounted thereon for up and down movement relative to the tractor; a normally inactive hydraulic ram connected to the tractor and member to raise and lower the latter relative to the tractor and normally maintaining the member rigid with the tractor, a conduit system to supply fluid to the ram including a normally closed valve, a mechanism mounted on the tractor and including a fixed case in which the valve is mounted, a pendulum disposed in the case for swinging movement in a plane lengthwise of the tractor, the valve including an actuating arm, a first lever linked to the arm, a shaft supported in the case on which the pendulum is hung, an eccentric secured on the shaft, a second lever, the latter lever being pivoted intermediate its ends on the eccentric, means pivoting the first lever on said second lever adjacent one end of the latter, an anchor point for the other end of said other lever, means connecting the pendulum and first lever to swing the latter in a valve opening direction upon relative swinging of the pendulum so as to actuate the ram and move the tool member, and manual means applied to the second lever at said anchor point to swing said second lever about the eccentric and cause the first lever to swing about its point of connection with the pendulum when the latter is stationary.

7. A structure, as in claim 6, in which said last named means includes a cross shaft journaled in the case parallel to the first named shaft, a hand lever on the cross shaft and an eccentric on said cross shaft, the hand lever having a slot straddling the eccentric with the opposite side walls of the slot engaging said eccentric.

References Cited in the file of this patent
UNITED STATES PATENTS

| | | |
|---|---|---|
| 1,936,518 | McColm | Nov. 21, 1933 |
| 2,048,866 | Hunt | July 28, 1936 |
| 2,306,284 | Shonnard | Dec. 22, 1942 |
| 2,338,897 | Boulogne et al. | Jan. 11, 1944 |
| 2,494,069 | Steffen | Jan. 10, 1950 |
| 2,502,217 | Guibor | Mar. 28, 1950 |
| 2,583,250 | Ball | Jan. 22, 1952 |